United States Patent
Chen et al.

(10) Patent No.: US 9,141,657 B2
(45) Date of Patent: Sep. 22, 2015

(54) CONTENT DELIVERY SYSTEM WITH PROFILE GENERATION MECHANISM AND METHOD OF OPERATION THEREOF

(71) Applicant: Samsung Electronics Co., Ltd., Gyeonggi-Do (KR)

(72) Inventors: Guangshun Chen, Saratoga, CA (US); Kuldip S. Pabla, San Jose, CA (US); Curtis Jyun Sasaki, Sunnyvale, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 115 days.

(21) Appl. No.: 13/724,868

(22) Filed: Dec. 21, 2012

(65) Prior Publication Data

US 2014/0181115 A1  Jun. 26, 2014

(51) Int. Cl.
| | |
|---|---|
| *G06F 17/30* | (2006.01) |
| *H04N 21/442* | (2011.01) |
| *H04N 21/466* | (2011.01) |
| *H04N 21/475* | (2011.01) |
| *H04N 21/482* | (2011.01) |

(52) U.S. Cl.
CPC .... *G06F 17/30321* (2013.01); *H04N 21/44204* (2013.01); *H04N 21/44213* (2013.01); *H04N 21/44222* (2013.01); *H04N 21/4667* (2013.01); *H04N 21/4755* (2013.01); *H04N 21/4828* (2013.01)

(58) Field of Classification Search
USPC ............................ 707/2, 3, 732, 705; 705/26; 709/204–206
See application file for complete search history.

(56) References Cited

U.S. PATENT DOCUMENTS

| | | | |
|---|---|---|---|
| 7,617,308 B2 | 11/2009 | Doss et al. | |
| 7,860,889 B1 * | 12/2010 | Martino et al. | ............... 707/784 |
| 8,442,978 B2 * | 5/2013 | Berkhim et al. | ............. 707/732 |
| 2001/0051876 A1 | 12/2001 | Seigel et al. | |
| 2003/0110091 A1 * | 6/2003 | Inaba et al. | ..................... 705/26 |
| 2005/0071328 A1 | 3/2005 | Lawrence et al. | |
| 2008/0133716 A1 | 6/2008 | Rao et al. | |
| 2010/0180001 A1 | 7/2010 | Hardt | |
| 2010/0251305 A1 | 9/2010 | Kimble et al. | |
| 2010/0262615 A1 * | 10/2010 | Oztekin et al. | ................ 707/768 |
| 2011/0231258 A1 | 9/2011 | Winters et al. | |
| 2011/0295687 A1 | 12/2011 | Bilenko et al. | |
| 2012/0115453 A1 | 5/2012 | Zheng et al. | |
| 2012/0246302 A1 | 9/2012 | Lafleur et al. | |
| 2012/0254142 A1 * | 10/2012 | Knowlton et al. | ............ 707/705 |

OTHER PUBLICATIONS

Telenav, Inc., Smart Planner, http://www.appeden.com/ios/productivity/smart-planner, Jul. 12, 2011.

* cited by examiner

*Primary Examiner* — Etienne Leroux

(74) *Attorney, Agent, or Firm* — IP Investment Law Group

(57) ABSTRACT

A method of operation of a content delivery system includes: generating a first user profile for representing a user's identity in a context; generating a second user profile for representing the user's identity in a different context; selecting the first user profile or the second user profile based on the context or the different context; and generating a display content based on the first user profile or the second user profile for displaying on a device.

20 Claims, 6 Drawing Sheets

CONTENT DELIVERY SYSTEM WITH PROFILE GENERATION MECHANISM AND METHOD OF OPERATION THEREOF

TECHNICAL FIELD

An embodiment of the present invention relates generally to a content delivery system, and more particularly to a system for profile generation mechanism.

BACKGROUND

Modem portable consumer and industrial electronics, especially client devices such as navigation systems, cellular phones, portable digital assistants, and combination devices are providing increasing levels of functionality to support modem life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide personalized content through a mobile device, such as a cell phone, smart phone, or a personal digital assistant.

Personalized content services allow users to create, transfer, store, and/or consume information in order for users to create, transfer, store, and consume in the "real world." One such use of personalized content services is to efficiently transfer or guide users to the desired product or service.

Content delivery system and personalized content services enabled systems have been incorporated in automobiles, notebooks, handheld devices, and other portable products. Today, these systems aid users by incorporating available, real-time relevant information, such as advertisement, entertainment, local businesses, or other points of interest (POI).

Thus, a need still remains for a content delivery system with profile generation mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a content delivery system including: generating a first user profile for representing a user's identity in a context; generating a second user profile for representing the user's identity in a different context; selecting the first user profile or the second user profile based on the context or the different context; and generating a display content based on the first user profile or the second user profile for displaying on a device.

An embodiment of the present invention provides a method of operation of a content delivery system including: generating a first user profile having a profile feature for representing a user's identity in a context; generating a second user profile having the profile feature for representing the user's identity in a different context; selecting the first user profile or the second user profile based on the context or the different context; and generating a display content based on the first user profile or the second user profile for displaying on a device.

An embodiment of the present invention provides a content delivery system, including: a first profile generation module for generating a first user profile for representing a user's identity in a context; a second profile generation module, coupled to the first profile generation module, for generating a second user profile for representing the user's identity in a different context; a selection module, coupled to the second profile generation module, for selecting the first user profile or the second user profile based on the context or the different context; and a content generation module, coupled to the selection module, for generating a display content based on the first user profile or the second user profile for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
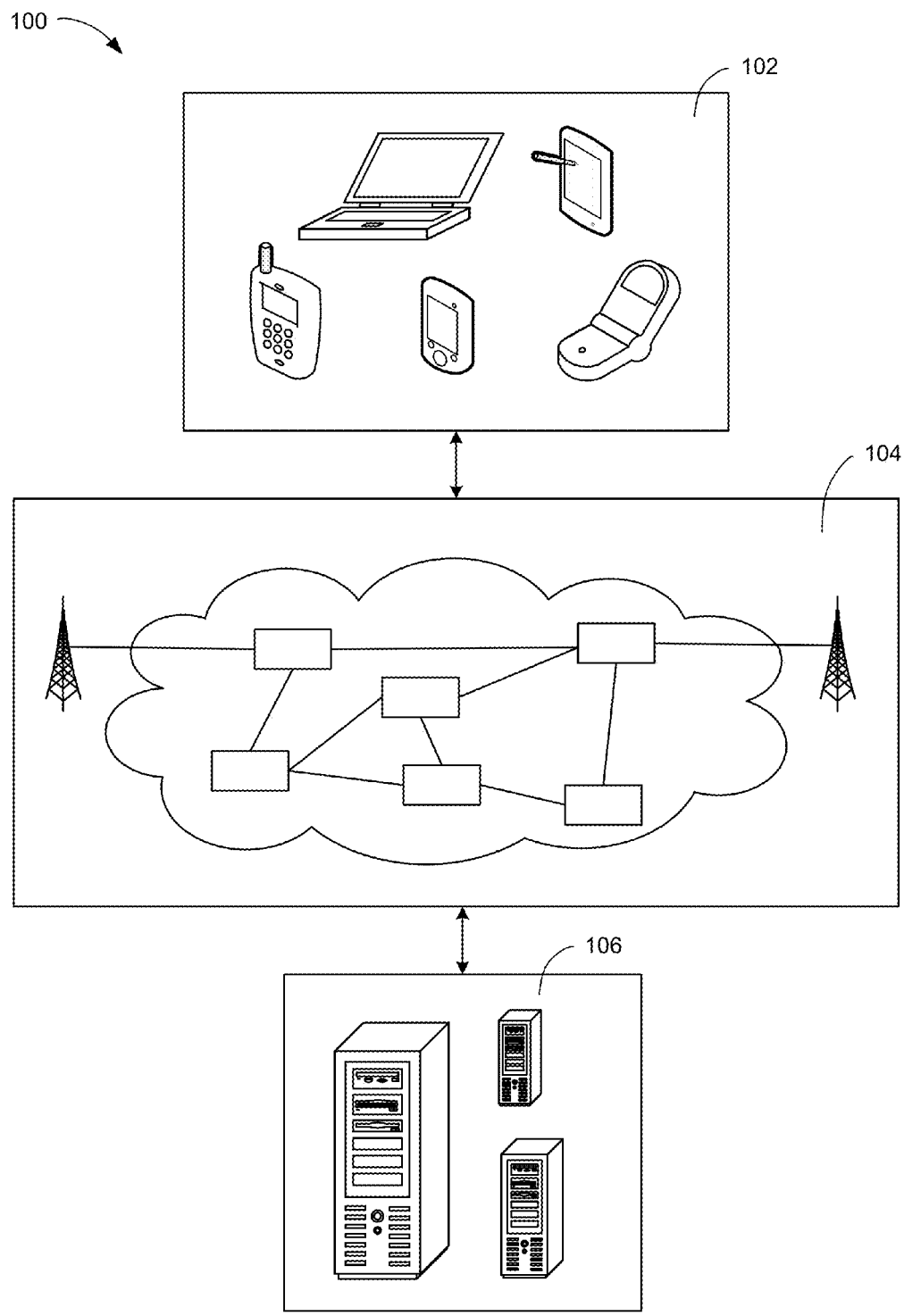
FIG. 1 is a content delivery system with profile generation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures. is arbitrary for the most part. Generally, the invention can be operated in any orientation.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a content delivery system 100 with profile generation mechanism in an embodiment of the present invention. The content delivery system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, wearable digital device, tablet, notebook computer, television (TV), automotive telematic communication system, or other multi-functional mobile communication or entertainment device. The first device 102 can be a standalone device, or can be incorporated with a vehicle, for example a car, truck, bus, aircraft, boat/vessel, or train. The first device 102 can couple to the communication path 104 to communicate with the second device 106.

For illustrative purposes, the content delivery system 100 is described with the first device 102 as a display device, although it is understood that the first device 102 can be different types of devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Android™ smartphone, or Windows™ platform smartphone.

For illustrative purposes, the content delivery system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, aircraft, boat/vessel, or train.

Also for illustrative purposes, the content delivery system 100 is shown with the second device 106 and the first device 102 as end points of the communication path 104, although it is understood that the content delivery system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
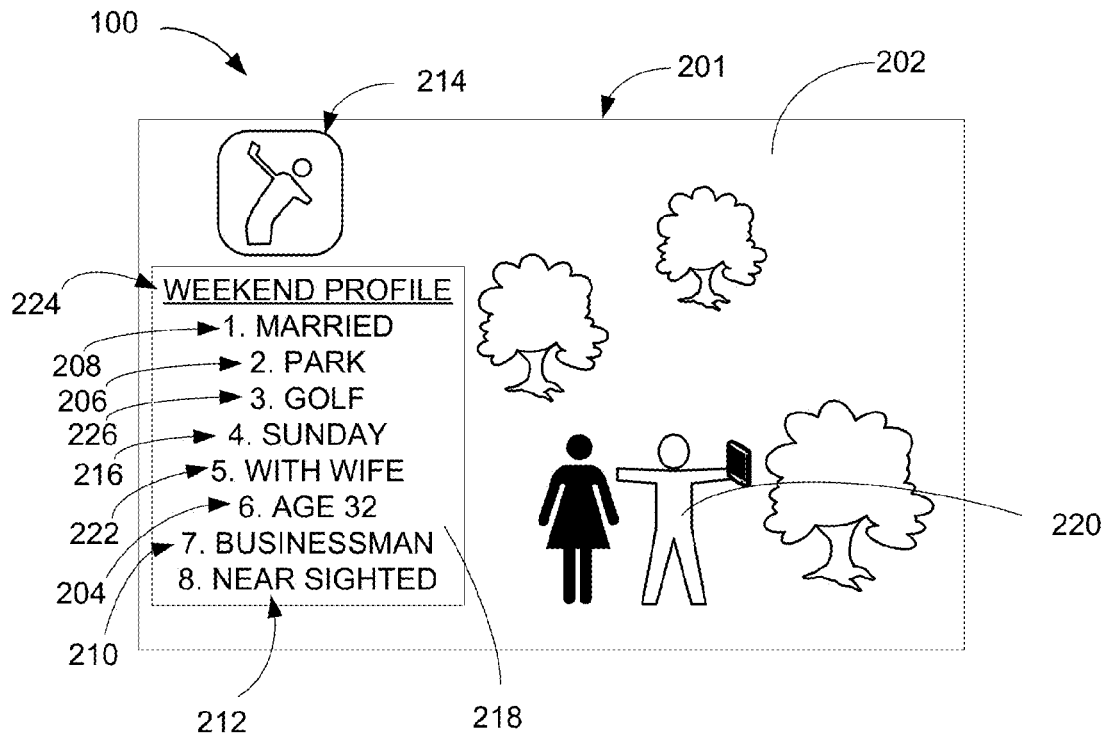
FIG. 2 is a first example of a display interface of the first device of FIG. 1 displaying a context.

Referring now to FIG. 2, therein is shown a first example of a display interface 201 of the first device 102 of FIG. 1 displaying a context 202. The context 202 is defined as a situation, environment, or a combination thereof where the user of the first device 102 is situated. For example, the content delivery system 100 can determine the context 202 based on various factors.

For a specific example, the context 202 can be determined based on user information 204. More specifically, the user information 204 can include a location setting 206. The location setting 206 can represent a current geographic location, past geographic location visited, or future geographic location planned to be visited by the user of the first device 102. The location setting 206 can also represent professional environment, personal environment, or a combination thereof where the first device 102 is located. The location setting 206 can also represent who else is nearby the user of the first device 102. For example, the content delivery system 100 can determine who is near by identifying the GPS information of another device near the first device 102. The illustration of FIG. 2 can depict the location setting 206 to be in a park.

The user information 204 can include a user's interest 226, demographic information 208, professional information 210, health information 212, or a combination thereof. For example, the user's interest 226 can represent the preference shown by the user of the first device 102. For a specific example, the user's interest 226 can represent interest in playing golf.

The user information 204 can include an activity record 214, such as the user's behavior or an activity pattern. The activity record 214 can represent the user's activity pattern in the past time, the current time, or the future time. For example, the activity record 214 can show that the user plays golf every Sunday with his wife. For another example, the activity record 214 can include a pattern of activity for using the first device 102, the service provided by the content delivery system 100, or a combination thereof by the user.

The demographic information 208 can represent the user's family structure, cultural background, or a combination thereof. For example, the demographic information 208 illustrated in FIG. 2 can represent a family structure of the user being married without any kids. The professional information 210 can represent the user's occupation, education background, job title, place of occupation, or a combination thereof. The health information 212 can represent the user's age, health condition, or a combination thereof. For example, the health information 212 illustrated in FIG. 2 can represent user being 32 years old.

The context 202 can also be determined based on a context time 216. The context time 216 is defined as a representation of time for the context 202. The context time 216 can represent the time of the day when the context 202 is occurring. The context time 216 can also represent the future time when the context 202 can scheduled to occur. More specifically, the context 202 of family gathering can be scheduled on the user's calendar application on the first device 102 for the context time 216 of next weekend. For a specific example, the context time 216 can represent Sunday afternoon. More specifically, the user can be in the location setting 206 of a park on Sunday afternoon with his wife.

A first user profile 218 is defined as a composition of various factors to represent a user's identity 220 under the context 202. For example, the first user profile 218 can represent the user's identity 220 in the context 202 of work. For another example, the user's identity 220 for the user of the first device 102 can represent a husband who is age 32.

As illustrated in FIG. 2, the first user profile 218 under the context 202 can include the user at the park playing golf with the user's wife on a Sunday. More specifically, the first user profile 218 under this instance of the context 202 can represent a "Weekend Profile." Furthermore, same user of the first device 102 can have multiple instances of the first user profile 218. Each instance of the first user profile 218 can represent the same user of the first device 102 under the specific instance of the context 202 where the first device 102 is identified or situated. For example, a seasonal instance of the first user profile 218 can be generated to reflect the context 202 representing the different occasion of the seasons of the year.

The first user profile 218 can include a profile feature 222. The profile feature 222 is defined as a dimension or a characteristic of the user's identity 220 represented in the first user profile 218. The profile feature 222 can represent the user information 204, the context time 216, or a combination thereof. The first user profile 218 can include multiple instances of the profile feature 222. For example, the "Weekend Profile" can include two instances of the demographic information 208 representing "married" and "with wife."

The first user profile 218 can be categorized according to a profile type 224. For example, more than one instance of the first user profile 218 can represent the user's identity 220 and each of the first user profile 218 can be categorized by the profile type 224. For example, under the context 202 of work, the first user profile 218 can have the profile type 224 of a professional profile. For a different example, under the context 202 of spending time in the park, the first user profile 218 can have the profile type 224 of a personal profile.

Figure 3:
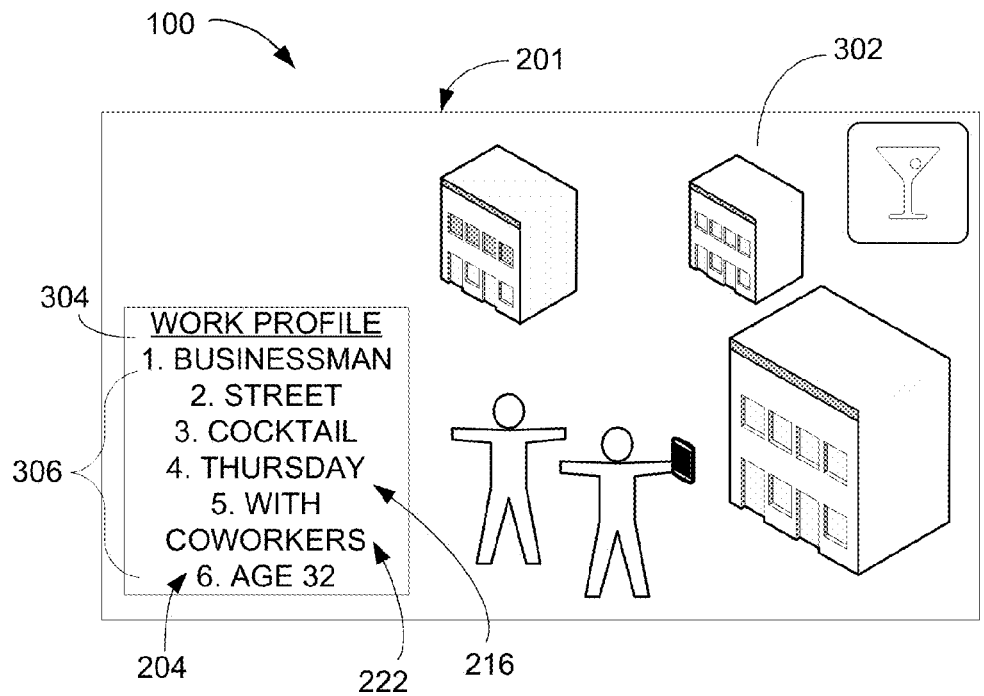
FIG. 3 is a second example of the display interface displaying a different context.

Referring now to FIG. 3, therein is shown a second example of the display interface 201 displaying a different context 302. The different context 302 is defined as a situation, environment, or a combination thereof where the user of the first device 102 of FIG. 1 is situated different from the context 202 of FIG. 2. The content delivery system 100 can determine the different context 302 similarly as determining the context 202. For example, the different context 302 can be determined based on the user information 204, the context time 216, or a combination thereof.

Additionally, FIG. 3 can illustrate a second user profile 304 for the user's identity 220 of FIG. 2 under the different context 302. The second user profile 304 can represent the different instance of the first user profile 218 of FIG. 2. For example, the second user profile 304 can represent the user's identity 220 under the different context 302. Element names with "first" or "second" does not connote, for example, priority, ordinal relationship, or a combination thereof, but rather labeled for identification purposes.

For a specific example, the location setting 206 of FIG. 2 can represent the city, neighborhood, street, or a combination thereof. The user's interest 226 of FIG. 2 can represent going out for a drink with coworkers. The demographic information 208 of FIG. 2, the professional information 210 of FIG. 2, and the health information 212 of FIG. 2 can be the same as illustrated in FIG. 2. The context time 216 can represent Thursday night.

The second user profile 304 representing the "Work Profile" can include the profile feature 222 different from the first user profile 218 when the first device 102 is under the context 202 illustrated in FIG. 2. More specifically, the profile feature 222 representing the user information 204 can change from "husband" to "businessman" and the context time 216 can change from "Sunday" to "Thursday." However, the first user profile 218 and the second user profile 304 can have the same instance of the profile feature 222. For example, the health information 212 for the age can remain same at age "32" because the "Work Profile" can still represent the same user of the first device 102.

A feature set 306 can represent an affinity grouping for multiple instances of the profile feature 222. For example, one instance of the profile feature 222 can represent businessman. Another instance of the profile feature 222 can represent business address. Each instances of the profile feature 222, such as businessman and business address, can be associated with the context 202 of work. The feature set 306 can represent the plurality of the profile feature 222 associated with the context 202 of work.

Figure 4:
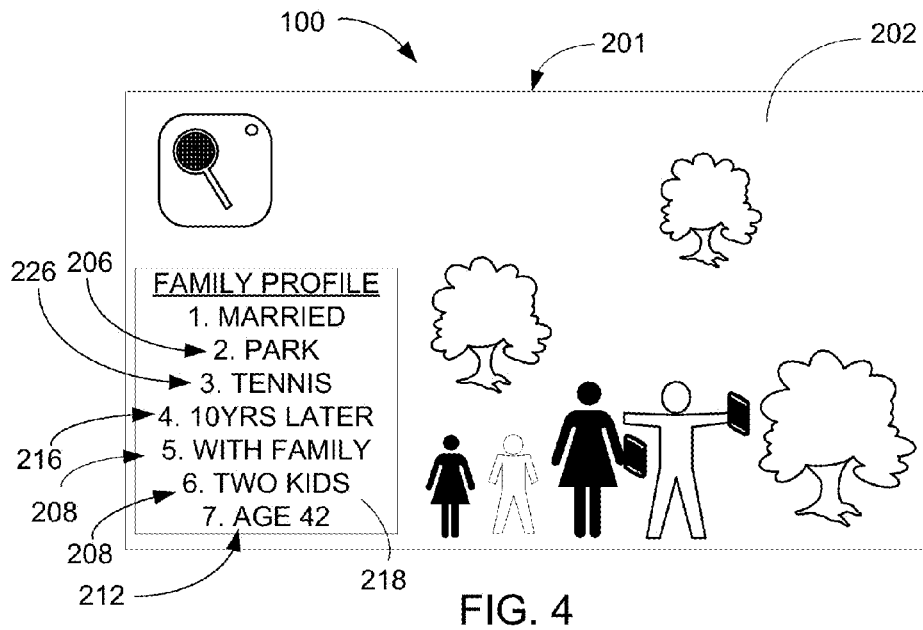
FIG. 4 is a third example of the display interface displaying the first user profile that changed over time.

Referring now to FIG. 4, therein is shown a third example of the display interface 201 displaying the first user profile 218 that changed over time. For example, the context 202 illustrated in FIG. 4 can represent the context 202 of FIG. 2 after ten years. The first user profile 218 representing "Family Profile" can be updated by the content delivery system 100 to reflect the changes in the demographic information 208, the health information 212, and the context time 216.

More specifically, the demographic information 208 can include "two kids" after the user of first device 102 having a son and a daughter added to his family. The health information 212 can be updated to age of 42 after ten years. Additionally, the context time 216 can represent ten years after the context time 216 as illustrated in FIG. 2. However, the demographic information 208 representing the marital status, the location setting 206 representing the park, and the user's interest 226 of tennis can remain the same as illustrated in FIG. 2.

Figure 5:
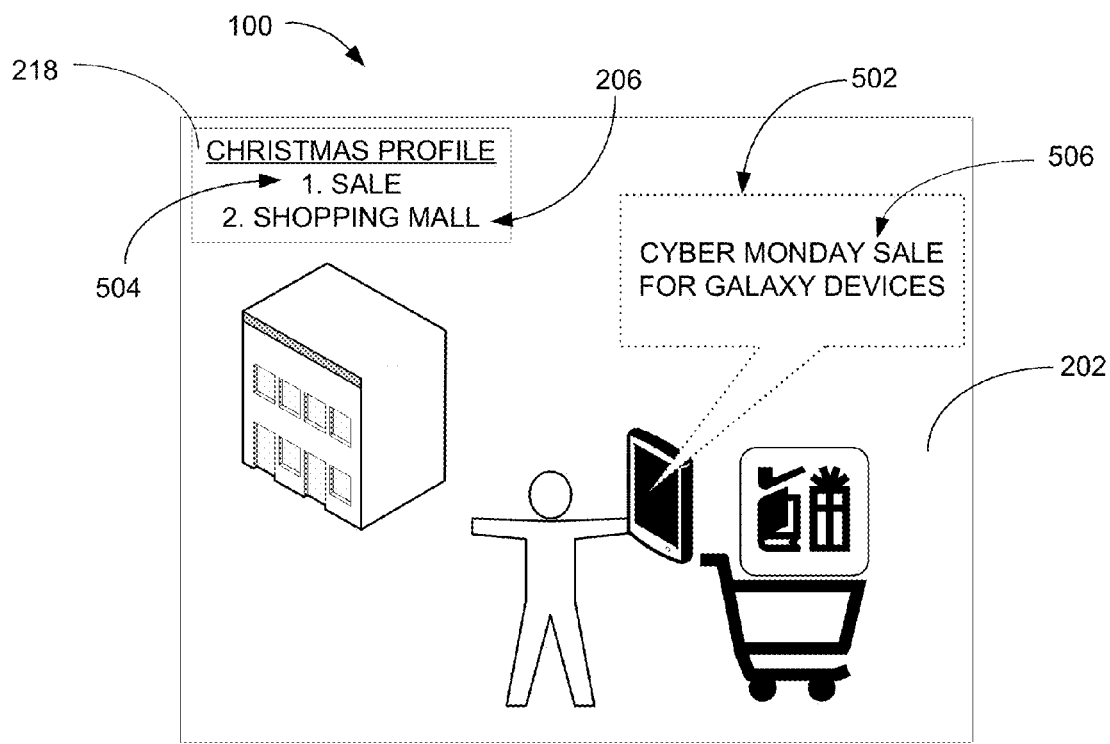
FIG. 5 is an example of a display content displayed on the first device.

Referring now to FIG. 5, therein is shown an example of a display content 502 displayed on the first device 102 of FIG. 1. More specifically, the content delivery system 100 can generate the display content 502 relevant to the first user profile 218 under the particular instance of the context 202. For example, the first user profile 218 can represent "Christmas Profile." The location setting 206 can represent the shopping mall. The context 202 can represent shopping for Christmas presents.

The content delivery system 100 can select the appropriate instance of the first user profile 218 for the context 202. As a result, the content delivery system 100 can generate the display content 502 appropriate under the context 202 for the particular instance of the first user profile 218. For example, since the first user profile 218 is "Christmas Profile," the content delivery system 100 can generate the display content 502 of "Christmas sales" at a department store within the shopping mall.

Furthermore, the first user profile 218 can base on external information 504 in addition to the user information 204. For example, the external information 504 can represent information independent from the user information 204. More specifically, the external information 504 can represent factors considered by the content delivery system 100 for generating the first user profile 218, the second user profile 304 of FIG. 3, or a combination thereof. The first user profile 218 can include the profile feature 222 of FIG. 2 based on the external information 504 and not based on the user information 204, such as the user's interest 226 of FIG. 2.

A third party content 506 can represent information that can be displayed on the first device 102 when found relevant. The third party content 506 can represent sales available at the shopping mall, news media, events, or a combination thereof. The external information 504 and the third party content 506 can be provided by a third party content provider. The third party content provider can represent the external sources physically separate from the first device 102.

If the context 202 where the first device 102 is located changes to the different instance of the location setting 206, the content delivery system 100 can update the display content 502 customized for the particular instance of the context 202. For example, the context time 216 can represent the future time scheduled on the calendar application on the first device 102 of FIG. 2. The context 202 can represent family gathering. The content delivery system 100 can generate the display content 502 representing a reminder notification to purchase the aunt's favorite chocolate.

Figure 6:
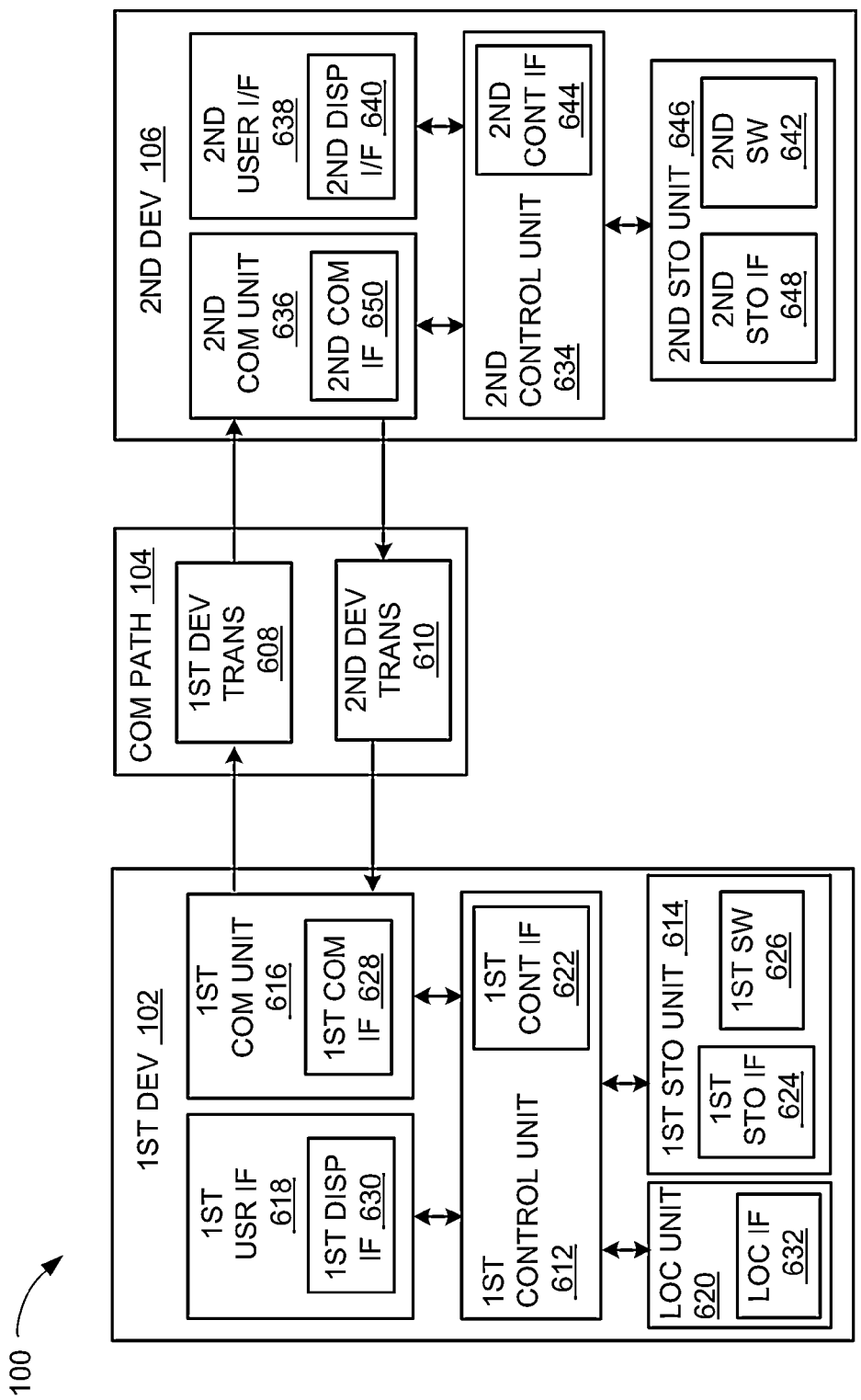
FIG. 6 is an exemplary block diagram of the content delivery system.

Referring now to FIG. 6, therein is shown an exemplary block diagram of the content delivery system 100. The content delivery system 100 can include the first device 102, the communication path 104, and the second device 106. The first device 102 can send information in a first device transmission 608 over the communication path 104 to the second device 106. The second device 106 can send information in a second device transmission 610 over the communication path 104 to the first device 102.

For illustrative purposes, the content delivery system 100 is shown with the first device 102 as a client device, although it is understood that the content delivery system 100 can have the first device 102 as a different type of device. For example, the first device 102 can be a server having a display interface.

Also for illustrative purposes, the content delivery system 100 is shown with the second device 106 as a server, although it is understood that the content delivery system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of the present invention.

The first device 102 can include a first control unit 612, a first storage unit 614, a first communication unit 616, a first user interface 618, and a location unit 620. The first control unit 612 can include a first control interface 622. The first control unit 612 can execute a first software 626 to provide the intelligence of the content delivery system 100.

The first control unit 612 can be implemented in a number of different manners. For example, the first control unit 612 can be a processor, an application specific integrated circuit (ASIC) an embedded processor, a microprocessor, a hardware control logic, a hardware finite state machine (FSM), a digital signal processor (DSP), or a combination thereof. The first control interface 622 can be used for communication between the first control unit 612 and other functional units in the first device 102. The first control interface 622 can also be used for communication that is external to the first device 102.

The first control interface 622 can receive information from the other functional units or from external sources, or can transmit information to the other functional units or to external destinations. The external sources and the external destinations refer to sources and destinations physically separate from to the first device 102.

The first control interface 622 can be implemented in different ways and can include different implementations depending on which functional units or external units are being interfaced with the first control interface 622. For example, the first control interface 622 can be implemented with a pressure sensor, an inertial sensor, a microelectromechanical system (MEMS), optical circuitry, waveguides, wireless circuitry, wireline circuitry, or a combination thereof.

The location unit 620 can generate location information, current heading, and current speed of the first device 102, as examples. The location unit 620 can be implemented in many ways. For example, the location unit 620 can function as at least a part of a global positioning system (GPS), an inertial navigation system, a cellular-tower location system, a pressure location system, or any combination thereof.

The location unit 620 can include a location interface 632. The location interface 632 can be used for communication between the location unit 620 and other functional units in the first device 102. The location interface 632 can also be used for communication that is external to the first device 102.

The location interface 632 can receive information from the other functional units or from external sources, or can transmit information to the other functional units or to external destinations. The external sources and the external destinations refer to sources and destinations physically separate from the first device 102.

The location interface 632 can include different implementations depending on which functional units or external units are being interfaced with the location unit 620. The location interface 632 can be implemented with technologies and techniques similar to the implementation of the first control interface 622.

The first storage unit 614 can store the first software 626. The first storage unit 614 can also store the relevant information, such as advertisements, points of interest (POI), navigation routing entries, or any combination thereof. The relevant information can also include news, media, events, or a combination thereof from the third party content provider.

The first storage unit 614 can be a volatile memory, a nonvolatile memory, an internal memory, an external memory, or a combination thereof. For example, the first storage unit 614 can be a nonvolatile storage such as non-volatile random access memory (NVRAM), Flash memory, disk storage, or a volatile storage such as static random access memory (SRAM).

The first storage unit 614 can include a first storage interface 624. The first storage interface 624 can be used for communication between and other functional units in the first device 102. The first storage interface 624 can also be used for communication that is external to the first device 102.

The first storage interface 624 can receive information from the other functional units or from external sources, or can transmit information to the other functional units or to external destinations. The external sources and the external destinations refer to sources and destinations physically separate from the first device 102.

The first storage interface 624 can include different implementations depending on which functional units or external units are being interfaced with the first storage unit 614. The first storage interface 624 can be implemented with technologies and techniques similar to the implementation of the first control interface 622.

The first communication unit 616 can enable external communication to and from the first device 102. For example, the first communication unit 616 can permit the first device 102 to communicate with the second device 106 of FIG. 1, an attachment, such as a peripheral device or a computer desktop, and the communication path 104.

The first communication unit 616 can also function as a communication hub allowing the first device 102 to function as part of the communication path 104 and not limited to be an end point or terminal unit to the communication path 104. The first communication unit 616 can include active and passive components, such as microelectronics or an antenna, for interaction with the communication path 104.

The first communication unit 616 can include a first communication interface 628. The first communication interface 628 can be used for communication between the first communication unit 616 and other functional units in the first device 102. The first communication interface 628 can receive information from the other functional units or can transmit information to the other functional units.

The first communication interface 628 can include different implementations depending on which functional units are being interfaced with the first communication unit 616. The first communication interface 628 can be implemented with technologies and techniques similar to the implementation of the first control interface 622.

The first user interface 618 allows a user (not shown) to interface and interact with the first device 102. The first user interface 618 can include an input device and an output device. Examples of the input device of the first user interface 618 can include a keypad, a touchpad, soft-keys, a keyboard, a microphone, an infrared sensor for receiving remote signals, or any combination thereof to provide data and communication inputs.

The first user interface 618 can include a first display interface 630. The first display interface 630 can include a display, a projector, a video screen, a speaker, or any combination thereof.

The first control unit 612 can operate the first user interface 618 to display information generated by the content delivery system 100. The first control unit 612 can also execute the first software 626 for the other functions of the content delivery system 100, including receiving location information from the location unit 620. The first control unit 612 can further execute the first software 626 for interaction with the communication path 104 via the first communication unit 616.

The second device 106 can be optimized for implementing the embodiment of the present invention in a multiple device embodiment with the first device 102. The second device 106 can provide the additional or higher performance processing power compared to the first device 102. The second device 106 can include a second control unit 634, a second communication unit 636, and a second user interface 638.

The second user interface 638 allows a user (not shown) to interface and interact with the second device 106. The second user interface 638 can include an input device and an output device. Examples of the input device of the second user interface 638 can include a keypad, a touchpad, soft-keys, a keyboard, a microphone, or any combination thereof to provide data and communication inputs. Examples of the output device of the second user interface 638 can include a second display interface 640. The second display interface 640 can include a display, a projector, a video screen, a speaker, or any combination thereof.

The second control unit 634 can execute a second software 642 to provide the intelligence of the second device 106 of the content delivery system 100. The second software 642 can operate in conjunction with the first software 626. The second control unit 634 can provide additional performance compared to the first control unit 612.

The second control unit 634 can operate the second user interface 638 to display information. The second control unit 634 can also execute the second software 642 for the other functions of the content delivery system 100, including operating the second communication unit 636 to communicate with the first device 102 over the communication path 104.

The second control unit 634 can be implemented in a number of different manners. For example, the second control unit 634 can be a processor, an embedded processor, a microprocessor, hardware control logic, a hardware finite state machine (FSM), a digital signal processor (DSP), or a combination thereof.

The second control unit 634 can include a second control interface 644. The second control interface 644 can be used for communication between the second control unit 634 and other functional units in the second device 106. The second control interface 644 can also be used for communication that is external to the second device 106.

The second control interface 644 can receive information from the other functional units or from external sources, or can transmit information to the other functional units or to external destinations. The external sources and the external destinations refer to sources and destinations physically separate from the second device 106.

The second control interface 644 can be implemented in different ways and can include different implementations depending on which functional units or external units are being interfaced with the second control interface 644. For example, the second control interface 644 can be implemented with a pressure sensor, an inertial sensor, a microelectromechanical system (MEMS), optical circuitry, waveguides, wireless circuitry, wireline circuitry, or a combination thereof.

A second storage unit 646 can store the second software 642. The second storage unit 646 can also store the relevant information, such as advertisements, points of interest (POI), navigation routing entries, or any combination thereof. The second storage unit 646 can be sized to provide the additional storage capacity to supplement the first storage unit 614.

For illustrative purposes, the second storage unit 646 is shown as a single element, although it is understood that the second storage unit 646 can be a distribution of storage elements. Also for illustrative purposes, the content delivery system 100 is shown with the second storage unit 646 as a single hierarchy storage system, although it is understood that the content delivery system 100 can have the second storage unit 646 in a different configuration. For example, the second storage unit 646 can be formed with different storage technologies forming a memory hierarchal system including different levels of caching, main memory, rotating media, or off-line storage.

The second storage unit 646 can be a volatile memory, a nonvolatile memory, an internal memory, an external memory, or a combination thereof. For example, the second storage unit 646 can be a nonvolatile storage such as non-volatile random access memory (NVRAM), Flash memory, disk storage, or a volatile storage such as static random access memory (SRAM).

The second storage unit 646 can include a second storage interface 648. The second storage interface 648 can be used for communication between other functional units in the second device 106. The second storage interface 648 can also be used for communication that is external to the second device 106.

The second storage interface 648 can receive information from the other functional units or from external sources, or can transmit information to the other functional units or to external destinations. The external sources and the external destinations refer to sources and destinations physically separate from the second device 106.

The second storage interface 648 can include different implementations depending on which functional units or external units are being interfaced with the second storage unit 646. The second storage interface 648 can be implemented with technologies and techniques similar to the implementation of the second control interface 644.

The second communication unit 636 can enable external communication to and from the second device 106. For example, the second communication unit 636 can permit the second device 106 to communicate with the first device 102 over the communication path 104.

The second communication unit 636 can also function as a communication hub allowing the second device 106 to function as part of the communication path 104 and not limited to be an end point or terminal unit to the communication path 104. The second communication unit 636 can include active and passive components, such as microelectronics or an antenna, for interaction with the communication path 104.

The second communication unit 636 can include a second communication interface 650. The second communication interface 650 can be used for communication between the second communication unit 636 and other functional units in the second device 106. The second communication interface 650 can receive information from the other functional units or can transmit information to the other functional units.

The second communication interface 650 can include different implementations depending on which functional units are being interfaced with the second communication unit 636. The second communication interface 650 can be implemented with technologies and techniques similar to the implementation of the second control interface 644.

The first communication unit 616 can couple with the communication path 104 to send information to the second device 106 in the first device transmission 608. The second device 106 can receive information in the second communication unit 636 from the first device transmission 608 of the communication path 104.

The second communication unit 636 can couple with the communication path 104 to send information to the first device 102 in the second device transmission 610. The first device 102 can receive information in the first communication unit 616 from the second device transmission 610 of the communication path 104. The content delivery system 100 can be executed by the first control unit 612, the second control unit 634, or a combination thereof. For illustrative purposes, the second device 106 is shown with the partition having the second user interface 638, the second storage unit 646, the second control unit 634, and the second communication unit 636, although it is understood that the second device 106 can have a different partition. For example, the second software 642 can be partitioned differently such that some or all of its function can be in the second control unit 634 and the second communication unit 636. Also, the second device 106 can include other functional units not shown in FIG. 6 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the content delivery system 100 is described by operation of the first device 102 and the second device 106. It is understood that the first device 102 and the second device 106 can operate any of the modules and functions of the content delivery system 100. For example, the first device 102 is described to operate the location unit 620, although it is understood that the second device 102 can also operate the location unit 620.

Figure 7:
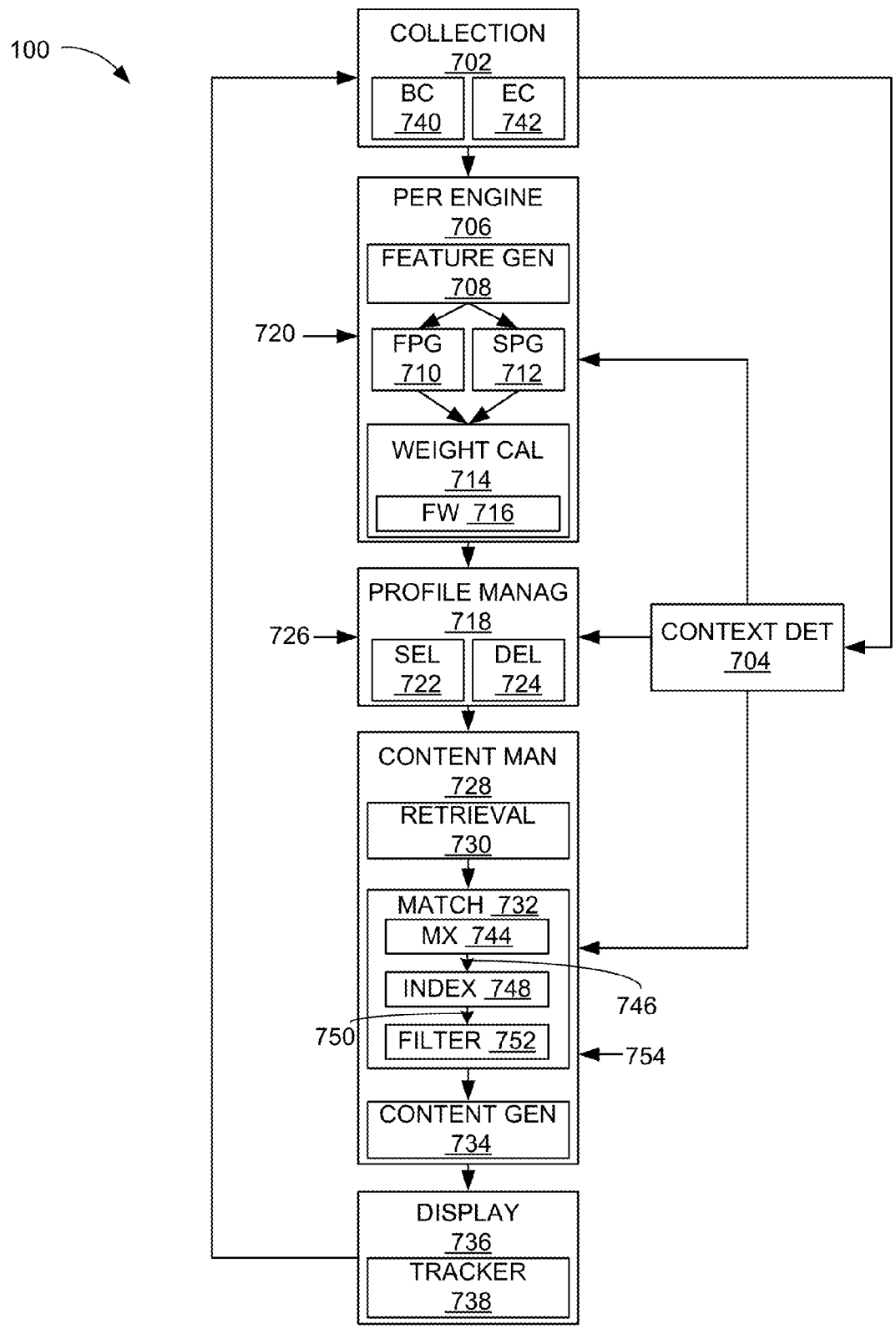
FIG. 7 is a control flow of the content delivery system.

Referring now to FIG. 7 therein is shown a control flow of the content delivery system 100. The content delivery system 100 can include a collection module 702. The collection module 702 collects the user information 204 of FIG. 2, the external information 504 of FIG. 5, or a combination thereof. For example, the collection module 702 can collect the user information 204 via the first control interface 622 of FIG. 6. For a different example, the collection module 702 can collect the external information 504 via the first control interface 622.

The collection module 702 can include a behavior collection module 740. The behavior collection module 740 collects the user information 204. The behavior collection module 740 can collect the user information 204 in a number of ways. For example, the behavior collection module 740 can collect the user information 204 by tracking the activity record 214 of FIG. 2. The activity record 214 can be tracked by tracking the time when the user started or terminated the application on the first device 102, the time when the user read the display content 502 of FIG. 2, read a news article, shared content in the social network, or a combination thereof.

The activity record 214 can also include the type of content searched or shared on the internet or content network, the type of music listened on the first device 102, the type of video file (e.g., movie and/or television show video clips) viewed on the first device 102, or the content of comments or rating posted using the first device 102 by the user. The behavior collection module 740 can collect the user information 204 by receiving the activity record 214 for the actions performed by the user on the first device 102 as discussed above. The application running on the first device 102 can include a data collection application program interface (API) to collect the actions performed on the first device 102.

The external collection module 742 can include an external collection module 742. The external collection module 742 collects the external information 504. The external collection module 742 can collect the external information 504 by subscribing content from external sources. For example, the external source can represent an electronic consumer good vendor. The vendor can provide information related to annual sale for the merchandize. The external collection module 742 can collect the external information 504 representing the annual sale by subscribing to the vendor's sale notification. The collection module 702 can send the user information 204, the external information 504, or a combination thereof collected to a context determination module 704.

The content delivery system 100 can include the context determination module 704, which can be coupled to the collection module 702. The context determination module 704 determines the context 202 of FIG. 2. For example, the context determination module 704 can determine the context 202 based on the user information 204, the context time 216 of FIG. 2, or a combination thereof. For another example, the context determination module 704 can determine the different context 302 of FIG. 3 different from the context 202 based on the user information 204, the context time 216, or a combination thereof.

The context determination module 704 can determine the context 202 in a number of ways. For example, the context determination module 704 can determine the context 202 based on the location setting 206 of FIG. 2. The context determination module 704 can determine the location setting 206 via the location unit 620 of FIG. 6 based on the GPS information. More specifically, the context determination module 704 can determine the GPS location of the first device 102 of FIG. 1 based on the latitudinal and longitudinal information. The GPS location can indicate whether the first device 102 is in an office or a park. As a result, the context determination module 704 can determine whether the first device 102 is in the context 202 of a professional setting, such as at work, or at a non-professional setting, such at a park or shopping center, based on the location setting 206.

For a different example, the context determination module 704 can determine the context 202 based on the context time 216, the activity record 214, the location setting 206, or a combination thereof. More specifically, the context time 216 can represent 7 PM. The activity record 214 indicates that the user eats dinner at a local Chinese restaurant every Tuesday. The activity record 214 can be recorded on the calendar application on the first device 102 and the location setting 206 for the restaurant can be determined based on the GPS information detected by location unit 620.

Based on the combination of the location setting 206, the activity record 214, and the context time 216, the context determination module 704 can determine the context 202 to be user having dinner. The context determination module 704 can determine the different context 302 similarly as to determining the context 202. The context determination module 704 can send the context 202, the different context 302, or a combination thereof determined to a personalization module 706.

The content delivery system 100 can include the personalization module 706, which can be coupled to the context determination module 704 and the collection module 702. The personalization module 706 generates the first user profile 218 of FIG. 2. For example, the personalization module 706 can generate the first user profile 218 for representing the user's identity 220 of FIG. 2 in the context 202. The personalization module 706 can also generate the second user profile 304 of FIG. 3 for representing the user's identity 220 in the different context 302. The personalization module 706 can receive the user information 204, the external information 504, or a combination thereof from the collection module 702.

The personalization module 706 can include a feature generation module 708. The feature generation module 708 generates the profile feature 222 of FIG. 2. For example, the feature generation module 708 can generate the profile feature 222 based on the user information 204, the context time 216, or a combination thereof. For a specific example, the feature generation module 708 can generate the profile feature 222 based on dividing or compartmentalizing the user information 204 into different dimension or category.

The feature generation module 708 can generate the profile feature 222 in a number of ways. For example, the user information 204 can represent an aggregation of various factors, such as the location setting 206, the user's interest 226 of FIG. 2, the demographic information 208 of FIG. 2, the professional information 210 of FIG. 2, the health information 212 of FIG. 2, or a combination thereof. The feature generation module 708 can generate the profile feature 222 by parsing the user information 204 into an individual dimension, such as the user's interest 226 or the location setting 206.

More specifically, the feature generation module 708 can parse the user information 204 by categorizing the user information 204. For example, the user information 204 related to the GPS information for the first device 102 at the Chinese restaurant can represent the location setting 206 of the first device 102. The feature generation module 708 can generate the profile feature 222 representing the location setting 206 by assigning the GPS information to the profile feature 222.

For another example, the user information 204 can represent the activity record 214 of the user of the first device 102 playing golf every weekend. Additionally, the activity record 214 shows that the user frequently searches on first device 102 for new golf clubs online. Based on the frequency of information logged for playing golf and searching for new golf clubs as shown in the activity record 214, the feature generation module 708 can determine the user's interest 226 to be golf. The feature generation module 708 can generate the profile feature 222 representing the user's interest 226 by assigning "golf" to the profile feature 222. As a result, the profile feature 222 can represent each individual dimension, such as the user's interest 226 or the location setting 206, of the user's identity 220.

For a different example, the feature generation module 708 can generate the profile feature 222 based on the context 202. More specifically, the feature generation module 708 can generate the profile feature 222 based on various instances of the context time 216 of the context 202. The feature generation module 708 can receive the context 202, the different context 302, or a combination thereof from the context determination module 704. The context time 216 can represent the hour of a day, the day in a week, a week in a month, or a combination thereof when the context 202 or the different context 302 is occurring or schedule to occur.

To represent each variations of the context time 216, the feature generation module 708 can generate the profile feature 222 for each variations of the context time 216. More specifically, the profile feature 222 can represent "eating out." Based on the context time 216, the profile feature 222 can represent a different type of cuisine. For example, the profile feature 222 can represent Chinese food for the context time 216 between 12 pm to 2 pm and Steak for the context time 216 between 6 pm to 9 pm.

The feature generation module 708 can generate the feature set 306 of FIG. 3 by organizing the profile feature 222 with a hierarchical structure. More specifically, the feature set 306 can represent "Vacation Destinations." The profile feature 222 can be categorized into sub-features, such as "Paris," "Tahiti," and "India" under the "Vacation Destinations."

More specifically, the feature generation module 708 can categorize various instances of the profile feature 222 into the feature set 306 by grouping each instances of the profile feature 222 based on the affinity. The affinity grouping can represent the activity record 214 of the top three number of searches performed on the first device 102 related to the possible vacation destinations. Continuing from the previous example, the instances of the activity record 214, such as "Paris," "Tahiti," and "India," can represent possible vacation destinations most frequently searched by the user on the first device 102. The feature generation module 708 can generate the feature set 306 of "Vacation Destinations" with instances of the profile feature 222 of "Paris," "Tahiti," and "India" over other destinations based on the frequency of the activity record 214 logged for "Paris," "Tahiti," and "India."

For another example, the feature generation module 708 can generate the feature set 306 based on a time series algorithm for grouping the user information 204, the external information 504, or a combination thereof frequently appeared under the context 202. A time series can represent a sequence of data points measured at successive time instants spaced at uniform time interval. For example, the activity record 214 can indicate that the particular instance of the user information 204 can occur at a particular time frame under the same instance of the context 202. More specifically, the activity record 214 can represent a trend for the pattern of activity by the user of the first device 102 at work.

The time series algorithm can track the trend of the user information 204 under the context 202 based on the frequency of the user information 204 appeared in the context 202. For example, the location setting 206 of the first device 102 can indicate that the GPS location is representing the user's workplace. Furthermore, the pattern of activity can indicate that the first device 102 can be consistently located at the user's workplace at the context time 216 of 10 AM during the weekdays. As a result, the context 202 can be determined as work. The affinity grouping can represent the categorization of the user information 204 occurring repetitively in the same instance of the context 202. The rate of appearance to be determined as frequent can be, for example, every day, every other day out of a week, or a combination thereof. Based on the time series algorithm, the feature generation module 708 can extrapolate that the similar instances of the activity record 214 occurring frequently under the context 202 of work to be the trend that belong in the same affinity grouping. As a result, the feature generation module 708 can generate the feature set 306 by grouping the user information 204 collected under the same instance of the context 202.

For a different example, the feature generation module 708 can generate the feature set 306 based on a clustering algorithm for grouping the user information 204, the external information 504, or a combination thereof sharing similarities. For example, the similarity can represent the activity record 214 indicating that various instances of the user information 204 are logged at a particular time frame, at a particular location, or in particular sequence of existence of information. This pattern of information logged in the activity record 214 can indicate a relationship and association between the user information 204 to establish the user's identity 220.

For a specific example, the combination of each instances of the user information 204 that includes the location setting 206, the context time 216, the demographic information 208, and the activity record 214 can cluster during the context 202 of Christmas season. Additionally, the external information 504 related to Christmas can also be collected during Christmas season. The frequent appearance of the information can represent an affinity grouping of the information. The affinity grouping can be based on the user information 204, the external information 504, or a combination thereof sharing the similarities. The similarity can be represented by the context 202, a theme, or a combination thereof. For example, the feature generation module 708 can generate the feature set 306 by filtering the user information 204, the external information 504, or a combination thereof unrelated to the theme of Christmas. Moreover, the feature generation module 708 can group the user information 204, the external information 504, or a combination thereof sharing the Christmas theme based on the clustering algorithm.

For example, the location setting 206 can indicate a shopping mall. The context time 216 can represent middle of December. The demographic information 208 can represent a family of four with two kids. The activity record 214 can indicate purchase of toys at a retail store. The external information 504 can represent Christmas sale. Based on the clustering algorithm, the feature generation module 708 can generate the feature set 306 for the context 202 by clustering various instances of the user information 204, the external information 506, or a combination thereof sharing the Christmas theme.

In contrast, according to the activity record 214, activities such as "surfing at the beach" may not appear frequently during the context 202 of Christmas season. Due to the infrequency, the clustering algorithm can determine that "surfing at the beach" does not belong in the feature set 306, thus, exclude the activity record 214 from the feature set 306.

For another example, the profile feature 222 can be generated based on information other than the user information 204. For example, the feature generation module 708 can generate the profile feature 222 based on aggregating the external information 504. The profile feature 222 can be generated based on the external information 504, such as a popular ranking. More specifically, the popularity ranking can base on the entry, such as rating or opinion, made by the user, users other than the user of first device 102, or a combination thereof on external sources, such as the social network website, the product review website, or a combination thereof. The feature generation module 708 can generate the profile feature 222 based on an availability of the external information 504, the user's interest 226, or a combination thereof.

For a specific example, the user's interest 226 can include playing golf and golfing merchandises. Furthermore, the user's interest 226 can also include particular professional golfer. The professional golfer can provide a high rating for a particular brand of golf clubs. The high rating can be presented based on selecting a number of stars provided on the rating website or opinions expressed in text on the product website.

The feature generation module 708 can perform the text mining algorithm to determine the relevancy of the content on the product website to the user's interest 226 for filtering the external information 504 unrelated to the user's interest 226 and extracting the external information 504 related to the user's interest 226. For example, the content can include the golfer's name, words such as "recommended," the name of the merchandise, or a combination thereof. The text mining algorithm can parse the content to decipher the keywords and determine the correlation by comparing to the keywords to the user's interest 226. The feature generation module 708 can generate the profile feature 222 representing the brand of golf club recommended by the professional golfer, the review website, or a combination thereof if the keywords mined matches the user's interest 226.

The feature generation module 708 can combine various algorithms discussed above to generate the profile feature 222 relevant to the context 202. The feature generation module 708 can send the profile feature 222 to a first profile generation module 710 and a second profile generation module 712.

The personalization module 706 can include the first profile generation module 710 and the second profile generation module 712, which the first profile generation module 710 and the second profile generation module 712 can be both coupled to the feature generation module 708. The first profile generation module 710 generates the first user profile 218. For example, the first profile generation module 710 can generate the first user profile 218 for representing the user's identity 220 in the context 202.

The second profile generation module 712 generates the second user profile 304. For example, the second profile generation module 712 can generate the second user profile 304 for representing the user's identity 220 in the different context 302. The second profile generation module 712 can generate the second user profile 304 similarly as to the first profile generation module 710 generating the first user profile 218. For brevity and clarity, the discussion below will focus on the first profile generation module 710 generating the first user profile 218.

The first profile generation module 710 can generate the first user profile 218 in a number of ways. For example, the first profile generation module 710 can generate the first user profile 218 based on the profile feature 222 relevant to the context 202.

As discussed previously, the profile feature 222 can be generated based on the relevancy to the context 202. For example, the plurality of the profile feature 222 can represent job category, job title, and salary. Another instances of the profile feature 222 can represent user's interest 226 of playing soccer and reading novels. The context 202 can represent work. As a result, the first profile generation module 710 can generate the first user profile 218 based on aggregating the instances of the profile feature 222 relevant to the context 202.

More specifically, the first profile generation module 710 can aggregate the instances of the profile feature 222 representing job category, job title, and salary because the instances of the profile feature 222 were determined to be relevant to the context 202 of work. The first profile generation module 710 can also categorize the first user profile 218 with the profile type 224 of FIG. 2 of professional profile based on a category of the profile feature 222 included in the first user profile 218. The instances of the profile feature 222 representing the user's interest 226 were not included because the instances were not relevant to the context 202.

For another example, the first profile generation module 710 can generate the first user profile 218 based on selecting the feature set 306 relevant to the context 202. As discussed above, the feature set 306 can be generated by grouping the instances of the profile feature 222 relevant to the context 202. One instance of the feature set 306 can represent the instances of the profile feature 222 related to work. Another instance of the feature set 306 can represent the instances of the profile feature 222 related to camping. The context 202 determined can represent camping in Yellowstone National Park. The first profile generation module 710 can generate the first user profile 218 representing "Camping Profile" based on selecting the feature set 306 relevant to the context 202 and filtering the feature set 306 irrelevant to the context 202.

It has been discovered that the content delivery system 100 generates the first user profile 218 customized to the context 202. By customizing the first user profile 218 according to the context 202, the content delivery system 100 can improve the delivery of the display content 502 to the first device 102 relevant to the context 202. As a result, the content delivery system 100 can deliver the display content 502 efficiently to enhance the user experience of using the first device 102 and the content delivery system 100.

For further example, the first profile generation module 710 and the second profile generation module 712 can generate the first user profile 218 and the second user profile 304 in parallel processes, in sequential order, or a combination thereof. The first profile generation module 710, the second profile generation module 712, or a combination thereof can send the first user profile 218, the second user profile 304, or a combination thereof to a weight calculator module 714.

The personalization module 706 can include the weight calculator module 714, which can be coupled to the first profile generation module 710 and the second profile generation module 712. The weight calculator module 714 calculates a feature weight 716, which is defined as a level of importance placed on the profile feature 222. For example, the feature weight 716 can range from 0 to 1 with 0 representing the lowest value for the feature weight 716 and 1 representing the highest value for the feature weight 716. For a specific example, the weight calculator module 714 can calculate the feature weight 716 of the profile feature 222 based on the context 202.

The weight calculator module 714 can calculate the feature weight 716 in a number of ways. For example, the context 202 can represent out of town. More specifically, the user of the first device 102 can be out of town for business, away from the home city. The weight calculator module 714 can increase the feature weight 716 for profile feature 222 representing the user's interest 226 of Chinese food from 0.2 to 0.8 to raise the level of importance for increasing the probability of displaying the display content 502 related to the user's interest 226.

For another example, the activity record 214 can indicate that the user of the first device 102 frequently visits Hawaii for vacation. More specifically, the activity record 214 can show high frequency of entries for the location setting 206 representing Hawaii in the first storage unit 614 of FIG. 6 and search queries related to Hawaii requested by the user on the first device 102. The entries logged in the activity record 214 can be determined as frequent if the entries were logged every hour, every day, or a combination thereof. The weight calculator module 714 can increase the profile feature 222 based on the frequency of the activity record 214 collected to increase the probability of displaying the display content 502 related to Hawaii.

The weight calculator module 714 can calculate the feature weight 716 for the same instance of the profile feature 222 within the one instance of the first user profile 218 with a higher value or a lower value based on a degree of relevancy of the profile feature 222 to the context 202. For example, the degree of relevancy can base on how far away in time period from the context time 216. More specifically, the context time 216 can represent year 2018 for the World Cup Soccer tournament in Moscow. The feature weight 716 for the profile feature 222 representing the World Cup Soccer can have a value less than 1 during the non-World Cup years or time other than 2018. However, once the World Cup year becomes closer, the weight calculator module 714 can increase the feature weight 716 to increase the relevancy of the profile feature 222.

After the World Cup is over in 2018, the weight calculator module 714 can decrease the feature weight 716 to the value of 0 to indicate that the degree of relevancy for the profile feature 222 to the context 202 has diminished. However, the weight calculator module 714 can increase the feature weight 716 to 0.25 in 2015, 0.5 in 2016, 0.75 in 2017, and 1 in 2018. Again, once the World Cup is over in 2018, the weight calculator module 714 can calculate the feature weight 716 to be less than 1 to reflect the decreased relevancy of the profile feature 222.

It has been discovered that the content delivery system 100 can calculate the feature weight 716 to adjust the importance of the profile feature 222. By modifying the feature weight 716 according to the context 202, the content delivery system 100 can customize the first user profile 218 according to the context 202 more accurately. As a result, the content delivery system 100 can deliver the display content 502 more efficiently and effectively for the enhanced user experience for operating the first device 102 and the content delivery system 100.

The weight calculator module 714 can calculate the feature weight 716 for the profile feature 222 within the first user profile 218 with a higher value or a lower value than the same type of the profile feature 222 within the second user profile 304 based on the context 202. For example, the first user profile 218 and the second user profile 304 can both include the profile feature 222 representing the user's interest 226 of fine dining. The first user profile 218 can be categorized with the profile type 224 of professional profile while the second user profile 304 can be categorized with the profile type 224 of personal profile. If the context 202 represents professional environment, the weight calculator module 714 can increase the value for the feature weight 716 for the profile feature 222 for the first user profile 218. More specifically, fine dining can be determined to be more relevant for the "Work Profile" than the "Family Profile" for taking clients out for a meal under the context 202. As a result, the weight calculator module 714 can decrease the feature weight 716 for the profile feature 222 of fine dining for the "Family Profile" to reflect the decrease of relevancy of the profile feature 222 under the context 202.

It has been discovered that the content delivery system 100 can calculate the feature weight 716 to customize the importance of the profile feature 222 for multiple instances of the first user profile 218. By modifying the feature weight 716 for each instances of the first user profile 218 according to the context 202, the content delivery system 100 can improve the relevancy of the first user profile 218 for the context 202. As a result, the content delivery system 100 can deliver the display content 502 more efficiently and effectively for the enhanced user experience for operating the first device 102 and the content delivery system 100.

The weight calculator module 714 can calculate the feature weight 716 for the feature set 306. For example, the weight calculator module 714 can calculate the feature weight 716 by increasing or decreasing the value in equal proportion amongst the plurality of the profile feature 222 within the same instance of the feature set 306. The feature set 306 can include the plurality of the profile feature 222 representing special sales, store locations, and product reviews for the context 202 of Christmas season. When the context 202 is no longer Christmas season, the weight calculator module 714 can calculate the feature weight 716 for the feature set 306 by decreasing the feature weight 716 for each instances of the profile feature 222 from the value of 1 to the value of 0. The personalization module 706 can send the first user profile 218, the second user profile 304, or a combination thereof to a profile management module 718.

For illustrative purposes, the content delivery system 100 is shown with the first profile generation module 710 generating the first user profile 218 based on the user information 204, although it is understood that the first profile generation module 710 can be operated differently. For example, the first profile generation module 710 can generate the first user profile 218 based on the feature weight 716 of the profile feature 222 of the first user profile 218 meeting or exceeding a weight threshold 720.

The weight threshold 720 is defined as the required value for the feature weight 716. For example, the weight threshold 720 can represent the required value for each instance of the feature weight 716. For a different example, the weight threshold 720 can represent the required aggregated value or average value of the plurality of the feature weight 716. The first profile generation module 710 can generate the first user profile 218 based on the aggregated or the average value for the plurality of the feature weight 716 for the plurality of the profile feature 222 within the first user profile 218 meeting or exceeding the weight threshold 720.

For example, the feature weight 716 for the profile feature 222 representing the World Cup Soccer can represent 0.5. The feature weight 716 for the profile feature 222 representing World Cup site of Moscow can represent 0.5. The weight threshold 720 can represent the average value of the instances of the feature weight 716. The weight threshold 720 can represent 0.75. Since the average value of the feature weight 716 did not meet the weight threshold 720, the first user profile 218 representing "World Cup" will not be generated.

For another example, the weight threshold 720 can represent 0.5. The feature weight 716 can represent 0.25. Because the feature weight 716 is less than the weight threshold 720, the first profile generation module 710 can generate the first user profile 218 excluding the profile feature 222 failing to meet the weight threshold 720. In contrast, if the feature weight 716 meets or exceeds the weight threshold 720, the first profile generation module 710 can generate the first user profile 218 including the profile feature 222.

It has been discovered that the content delivery system 100 can generate the first user profile 218 based on the feature weight 716 meeting or exceeding the weight threshold 720. By comparing the feature weight 716 to the weight threshold 720, the content delivery system 100 can further refine the profile feature 222 that should be included or not in the first user profile 218 under the context 202. As a result, the content delivery system 100 can deliver the display content 502 more efficiently and effectively for the enhanced user experience for operating the first device 102 and the content delivery system 100.

The content delivery system 100 can include the profile management module 718, which can be coupled to the personalization module 706. The profile management module 718 manages the first user profile 218 or the second user profile 304 based on the context 202. For example, the profile management module 718 can select the first user profile 218 or the second user profile 304 based on the context 202 or the different context 302. For a different example, the profile management module 718 can delete the first user profile 218, the second user profile 304, or a combination thereof based on the context 202.

The profile management module 718 can include a selection module 722. The selection module 722 selects the first user profile 218 or the second user profile 304. For example, the selection module 722 can select the first user profile 218 or the second user profile 304 based on the relevancy to the context 202 or the different context 302.

The selection module 722 can select the first user profile 218 or the second user profile 304 in a number of ways. The context 202 can represent the professional environment while the different context 302 can represent a social setting. The first user profile 218 can represent "Work Profile" while the second user profile 304 can represent "Party Profile." If the context 202 is determined to be the professional environment, the selection module 722 can select the first user profile 218 representing "Work Profile" based on the higher relevancy to the context 202. "Work Profile" can be determined to have higher relevancy based on including more instances of the profile feature 222 relevant for the context 202 of work than "Party Profile."

It has been discovered that the content delivery system 100 can select the first user profile 218 most suited for the context 202. By selecting the first user profile 218 according to the context 202, the content delivery system 100 can deliver the display content 502 more efficiently and effectively for the enhanced user experience for operating the first device 102 and the content delivery system 100.

The selection module 722 can select the first user profile 218 over the second user profile 304 based on the value of the feature weight 716 for the first user profile 218 exceeding the value of the feature weight 716 for the second user profile 304. For example, the comparison can be between the aggregated value of the plurality of the feature weight 716 for the plurality of the profile feature 222 in the first user profile 218 to the aggregated value of the plurality of the feature weight 716 for the plurality of the profile feature 222 in the second user profile 304. For a different example, the comparison can be between the averaged value of the plurality of the feature weight 716 for the first user profile 218 to the averaged value of the plurality of the feature weight 716 for the second user profile 304. The selection module 722 can select the first user profile 218 or the second user profile 304 based on the higher of the aggregated or the averaged value. The selection module 722 can resolve the conflict for selecting the first user profile 218 or the second user profile 304 under the same instance of the context 202 by selecting the profile with the higher value of the feature weight 716.

It has been discovered that the content delivery system 100 can select the first user profile 218 based on the feature weight 716 for resolving a conflict arising from both the first user profile 218 and the second user profile 304 possibly suited for the same instance of the context 202. By considering the feature weight 716, the content delivery system 100 can select the first user profile 218 if the first user profile 218 is found to be more relevant than the second user profile 304 for the context 202. As a result, the content delivery system 100 can deliver the display content 502 more efficiently and effectively for the enhanced user experience for operating the first device 102 and the content delivery system 100.

The profile management module 718 can include a deletion module 724. The deletion module 724 deletes the first user profile 218 or the second user profile 304. For example, the deletion module 724 can delete the first user profile 218 or the second user profile 304 based on the infrequency of use of the first user profile 218 or the second user profile 304.

For a specific example, the first user profile 218 can represent "Trip to Peru Profile." The user of the first device 102 can never visit Peru again in his lifetime. As a result, the deletion module 724 can delete the first user profile 218 for "Trip to Peru Profile."

For further example, the deletion module 724 can delete the first user profile 218 or the second user profile 304 based on a time threshold 726, which is defined as a time limit placed on the usage of the first user profile 218 or the second user profile 304. For example, the time threshold 726 can represent 5 years. If the first user profile 218 was never factored by the content delivery system 100 for generating the display content 502, the deletion module 724 can delete the first user profile 218.

For another example, the deletion module 724 can delete the first user profile 218 or the second user profile 304 based on the feature weight 716 failing to meet the weight threshold 720. For example, the weight threshold 720 can represent the requirement for the first user profile 218 to have at least one instance of the profile feature 222 with the feature weight 716 value of 1. If the first user profile 218 does not have the profile feature 222 with the feature weight 716 value of 1, the deletion module 724 can delete the first user profile 218.

For a different example, the weight threshold 720 can represent the aggregated or the averaged value for the plurality of the feature weight 716 for the plurality of the profile feature 222 for the first user profile 218. The deletion module 724 can delete the first user profile 218 if the aggregated or the averaged value for the plurality of the feature weight 716 fails to meet the weight threshold 720. The profile management module 718 can send the first user profile 218 or the second user profile 304 selected to a content management module 728.

It has been discovered that the content delivery system 100 can delete the first user profile 218 unsuited for the context 202. By deleting the first user profile 218, the content delivery system 100 can reallocate the processing resource used for selecting the first user profile 218. As a result, the content delivery system 100 can improve the performance with the additional resource for delivering the display content 502 to the first device 102.

The content delivery system 100 can include the content management module 728, which can be coupled to the profile management module 718. The content management module 728 generates the display content 502. For example, the content management module 728 can generate the display content 502 based on the first user profile 218 or the second user profile 304.

The content management module 728 can generate the display content 502 in a number of ways. The content management module 728 can include a retrieval module 730. The retrieval module 730 retrieves the third party content 506 of FIG. 5. For example, the retrieval module 730 can retrieve the third party content 506 from the external sources for generating the display content 502. The retrieval module 730 can retrieve the third party content 506 from the third party content provider via the first control interface 622.

The retrieval module 730 can retrieve the third party content 506 in a number of ways. For example, the retrieval module 730 can retrieve the third party content 506 using a semantic analysis. The semantic analysis can analyze the content of the third party content 506. More specifically, the third party content 506 can be displayed as content on a website. The third party content 506 can represent updated departure time for the user's flight schedule. The first user profile 218 can represent "Business Trip Profile." The "Business Trip Profile" can include the profile feature 222 representing an itinerary. Based on the profile feature 222, the retrieval module 730 can perform the semantic analysis by deciphering the flight number, the departure time, and keywords such as "delay" to retrieve the third party content 506 for the itinerary.

For another example, the retrieval module 730 can retrieve the third party content 506 using a metadata. The metadata can be provided from the external sources, such as the third party content provider, result from the semantic analysis, or a combination thereof. For example, the third party content 506 provided by the external sources can contain the metadata to categorize the content. More specifically, the metadata can be organized in a hierarchical structure which can correspond to the profile feature 222 of the first user profile 218.

For example, the hierarchical structure of the metadata can represent "News" at the top level of the hierarchy. Under "News," the metadata can represent various subcategories, such as "Top News," "Sports News," and "Entertainment News." The first user profile 218 can represent "News Reader Profile." The "News Reader Profile" can include the profile feature 222 representing "Sports News." Based on the profile feature 222, the retrieval module 730 can determine the category of the metadata for the content to retrieve the information relevant to the first user profile 218. For a specific example, the retrieval module 730 can retrieve the content with the metadata of "Sports News" for the user of the first device 102.

For a different example, the retrieval module 730 can retrieve the third party content 506 based on the context 202 or the different context 302. More specifically, the location setting 206 can change from work to home. As a result, the context 202 where the first device 102 is situated can change as well. Furthermore, the third party content 506 interested by the user of the first device 102 can also change. For a specific example, the retrieval module 730 can change the retrieval of the third party content 506 from business news to entertainment news once the change in the context 202 is determined.

For another example, the retrieval module 730 can retrieve the third party content 506 based on the user's interest 226. The third party content 506 can represent media information, such as TV shows, movies, or a combination thereof. The media information can include media metadata, such as genre, key actors, directors, description, popularity, or a combination thereof. The user's interest 226 can represent "love comedy movie" for the genre. The retrieval module 730 can retrieve the third party content 506 related to media information relevant to the genre of "love comedy movie." The retrieval module 730 can send the third party content 506 retrieved to a match module 732.

The content management module 728 can include the match module 732, which can be coupled to the retrieval module 730. The match module 732 matches the third party content 506 retrieved to the first user profile 218. For example, the match module 732 can match the third party content 506 to the profile feature 222 of the first user profile 218.

The match module 732 can match in a number of ways. For example, the match module 732 can match the hierarchical structure of the third party content 506 retrieved to the hierarchical structure of the profile feature 222 of the first user profile 218. More specifically, the hierarchical structure of the third party content 506 can represent Hyundai™, a Korean automobile company with child structures with "Genesis™," "Elantra™," and "Veloster™," automobile models for Hyundai™. The profile feature 222 can also be organized with the hierarchical structure of Hyundai™ with the sub-feature of "Veloster™." The match module 732 can match the "Hyundai™" and "Veloster™" hierarchical structure of the third party content 506 to the "Hyundai™" and "Veloster™" hierarchical structure of the profile feature 222. More specifically, the match module 732 can match based on the similarity of the hierarchical structure. As discussed above, the match module 732 is able to match the third party content 506 to the profile feature 222 based on the same structure of the hierarchy.

For a different example, the match module 732 can match the third party content 506 based on the context 202 or the different context 302. For example, the location setting 206 can represent vacation in Hawaii. The third party content 506 retrieved can represent vacationing spots in Waikiki. The match module 732 can match the information related to Waikiki to the first user profile 218 representing "Vacation Profile." For another example, the context time 216 can represent 7 PM. The match module 732 can match the third party content 506 based on the context time 216. As a result, the match module 732 can match third party content 506 related to restaurants that serve dinner and filter information related to restaurants that serve breakfast. Further details regarding the filtration will be discussed below.

The match module 732 can include a matrix module 744. The matrix module 744 generates a user matrix 746. For example, the matrix module 744 can generate the user matrix 746 based on parsing the third party content 506 retrieved. The user matrix 746 can be generated for each instance of the third party content 506, a category for the third party content 506, or a combination thereof. For example, as discussed above, the third party content 506 can represent the media information. Further, the media information can include media metadata, such as entertainment type, genre, key actors, directors, description, popularity, or a combination thereof. The matrix module 744 can generate the user matrix 746 by having each metadata parsed as the column for the user matrix 746. The matrix module 744 can send the user matrix 746 to an index module 748.

The match module 732 can include the index module 748, which can couple the matrix module 744. The index module 748 calculates a similarity index 750. The similarity index 750 is defined as a pertinence level. For example, the similarity index 750 can represent how likely the user of the first device 102 will like the third party content 506. Further, the similarity index 750 can represent the relevancy of the third party content 506 to the user's interest 226.

The index module 748 can calculate the similarity index 750 in a number of ways. The index module 748 can calculate the similarity index 750 based on comparing the user's interest 226, the activity record 214, or a combination thereof to the third party content 506. For example, the third party content 506 can represent the media information. The user's interest 226 can represent "movie," "love comedy movie," or a combination thereof. The metadata for the media information can include the entertainment type representing "movie" and the genre representing "love comedy movie." The index module 748 can select the columns on the user matrix 746 for the entertainment type and the genre based on the user's interest 226 matching the metadata.

Further, the index module 748 can calculate the similarity index 750 based on the number of columns selected from the user matrix 746. For example, as described above, the user matrix 746 for the media information can include six columns. If all the columns were selected, the index module 748 can score the similarity index 750 of 100% or 1. In contrast, continuing from the previous example, only two columns, the entertainment type and the genre, out of six were selected. The index module 748 can calculate the similarity index 750 as 33% or 0.33. The similarity index 750 of 1 can represent a higher relevancy of the third party content 506 to the user information 204 than the similarity index 750 of 0.33.

For another example, the index module 744 can calculate the similarity index 750 based on a machine learning algorithm. The index module 744 can track the selection of the column for the user matrix 746. For example, the similarity index 750 for the third party content 506 representing the "Jerry Maguire," an American "love comedy movie," can be 0.75. The user matrix 746 representing another media information, such as "Knocked Up," an American "love comedy movie," can also have the same number of columns selected for the user matrix 746. The index module 744 can calculate the similarity index 750 based on the machine learning algorithm to extrapolate that the user matrix 746 having similar number of columns selected to score the same value of the similarity index 750. More specifically, the similarity index 750 for "Knocked Up" can also be 0.75.

For a different example, the index module 744 can calculate the similarity index 750 based on the context 202 or the different content 302. For example, the context 202 can represent a weekend. The index module 744 can calculate the similarity index 750 to be a value of 1 because the user's interest 226 includes going to movies on the weekend. In contrast, the different context 302 can represent a weekday. The index module 744 can calculate the similarity index 750 to be a value of 0 because the user's interest 226 does not include going to the movies during the weekday. The index module 744 can send the similarity index 750 to a filtration module 752.

The match module 732 can include the filtration module 752, which can be coupled to the index module 748. The filtration module 752 can filter the third party content 506 found irrelevant. For example, the filtration module 752 can filter the third party content 506 based on the similarity index 750 below an index threshold 754. The index threshold 754 is defined as the required value for the similarity index 750. For example, the index threshold 754 can represent the required aggregated value or average value of the plurality of the similarity index 750. More specifically, the filtration module 752 can set the index threshold 754 to represent the average value of the instances of the similarity index 750 for multiples users of the content delivery system 100. The index threshold 754 can represent 0.5. The similarity index 750 below the index threshold 754 can be deemed irrelevant, thus, filtered.

For another example, the filtration module 752 can filter based on the context 202 or the different context 302. For example, the calendar application on the first device 102 can indicate a meeting at 12 PM. The filtration module 752 can filter information related to lunchtime special offered by local restaurant but not filter the third party content 506 related to food delivery service for the office.

For illustrative purposes, the match module 732 can match the third party content 506 to the first user profile 218 based on the hierarchical structure, although it is understood that the match module 732 can be operated differently. For example, the match module 732 can match the third party content 506 to the first user profile 218 based on the similarity index 750 meeting or exceeding the index threshold 754. As discussed above, the similarity index 750 meeting or exceeding the index threshold 754 can be determined as relevant to the first use profile 218. As a result, the third party content 506, such as the "Knocked Up," can be matched with the first user profile 218.

For illustrative purposes, the filtration module 752 can filter the third party content 506, although it is understood that the filtration module 752 can be operated different. For example, the filtration module 752 can update the index threshold 754. The index threshold 754 can represent the average value of the similarity index 750 related to the third party content 506 for "action movie." The index threshold 754 can represent 0.5.

The filtration module 752 can increase or decrease the value of the index threshold 754 based on the user information 204, the external information 504, or a combination thereof. Continuing with the example, the user of the first device 102 can initially receive the third party content 506 with the similarity index 750 with the value of 0.5, thus meeting the index threshold 754. However, as logged in the activity record 214, the third party content 506 does not increase the frequency of activity related to the third party content 506 on the first device 102. As a result, the filtration module 752 can increase the index threshold 754 to 0.6 for raising the threshold for the third party content 506 of "action movie" to be matched with the first user profile 218. By raising the index threshold 754, the match module 732 can decrease the number of the third party content 506 found uninterested by the user of the first device 102.

The content management module 728 can include a content generation module 734, which can be coupled to the match module 732. The content generation module 734 generates the display content 502. For example, the content generation module 734 generates the display content 502 based on the third party content 506 determined to have matched the first user profile 218. The content generation module 734 can send the display content 502 to a display module 736.

The content delivery system 100 can include the display module 736, coupled to the content management module 728. The display module 736 displays the display content 502 on the first device 102. The display module 736 can include a tracker module 738. The tracker module 738 can generate the activity record 214 by tracking the activity performed on the first device 102. As discussed above, the activity record 214 can include the time when the user started or terminated the application on the first device 102, the time when the user read the display content 502, read a news article, shared the display content 502 in the social network, or a combination thereof. The tracker module 738 can send the activity record 214 to the collection module 702.

For illustrative purposes, the content delivery system 100 is shown with the first profile generation module 710 generating the first user profile 218 based on the profile feature 222 representing the user information 204, although it is understood that the first profile generation module 710 can be operated differently. For example, the first profile generation module 710 can update the first user profile 218. The second profile generation module 712 can update the second user profile 304 similarly as the first profile generation module 710 updating the first user profile 218 as discussed below.

The first profile generation module 710 can update the first user profile 218 for the same instance of the context 202. For example, the first user profile 218 can represent "Family Profile." Initially, the "Family Profile" can include the profile feature 222 representing the demographic information 208. The demographic information 208 can initially represent husband and wife without kids. However, once the couple has a kid, the first profile generation module 710 can update the first user profile 218 to include the profile feature 222 representing a child. The first profile generation module 710 can update the first user profile 218 by adding, deleting, or a combination thereof the profile feature 222 in the first user profile 218.

It has been discovered that the content delivery system 100 can update the same instance of the first user profile 218 to improve the representation of the user's identity 220 under the context 202. Even if the context 202 does not change, the first user profile 218 suited for the context 202 can change. As a result, the content delivery system 100 can update the first user profile 218 to improve the relevancy of the first user profile 218 for the context 202. As a result, the accuracy of delivering the display content 502 that matches the first user profile 218 can be improved for the enhanced user experience for operating the first device 102 and the content delivery system 100.

The physical transformation for determining the context 202 results in movement in the physical world, such as people using the first device 102, based on the operation of the content delivery system 100. As the movement in the physical world occurs, the movement itself creates additional information that is converted back into updating the feature weight 716, the first user profile 218, or a combination thereof under the context 202 for the continued operation of the content delivery system 100 and to continue movement in the physical world.

The first software 626 of FIG. 6 of the first device 102 of FIG. 6 can include the content delivery system 100. For example, the first software 626 can include the collection module 702, the context determination module 704, the personalization module 706, the profile management module 718, the content management module 728, and the display module 736.

The first control unit 612 of FIG. 6 can execute the first software 626 for the collection module 702 to collect the user information 204, the external information 504, or a combination thereof. The first control unit 612 can execute the first software 626 for the context determination module 704 to determine the context 202, the different context 302, or a combination thereof. The first control unit 612 can execute the first software 626 for the personalization module 706 to generate the first user profile 218, the second user profile 304, or a combination thereof.

The first control unit 612 can execute the first software 626 for the profile management module 718 for selecting the first user profile 218, the second user profile 304, or a combination thereof. The first control unit 612 can execute the first software 626 for content management module 728 for generating the display content 502. The first control unit 612 can execute the first software 626 for the display module 736 for displaying the display content 502.

The second software 642 of FIG. 6 of the second device 106 of FIG. 6 can include the content delivery system 100. For example, the second software 642 can include the collection module 702, the context determination module 704, the personalization module 706, the profile management module 718, the content management module 728, and the display module 736.

The second control unit 634 of FIG. 6 can execute the second software 642 for the collection module 702 to collect the user information 204, the external information 504, or a combination thereof. The second control unit 634 can execute the second software 642 for the context determination module 704 to determine the context 202, the different context 302, or a combination thereof. The second control unit 634 can execute the second software 642 for the personalization module 706 to generate the first user profile 218, the second user profile 304, or a combination thereof.

The second control unit 634 can execute the second software 642 for the profile management module 718 for selecting the first user profile 218, the second user profile 304, or a combination thereof. The second control unit 634 can execute the second software 642 for content management module 728 for generating the display content 502. The second control unit 634 can execute the second software 642 for the display module 736 for displaying the display content 502.

The content delivery system 100 can be partitioned between the first software 626 and the second software 642. For example, the second software 642 can include the personalization module 706, the profile management module 718, and the content management module 728. The second control unit 634 can execute modules partitioned on the second software 642 as previously described.

The first software 626 can include the collection module 702, the context determination module 704, and the display module 736. Based on the size of the first storage unit 614, the first software 626 can include additional modules of the content delivery system 100. The first control unit 612 can execute the modules partitioned on the first software 626 as previously described.

The first control unit 612 can operate the first communication unit 616 of FIG. 6 to send the activity record 214 to the second device 106. The first control unit 612 can operate the first software 626 to operate the location unit 620. The second communication unit 636 of FIG. 6 can send the display content 502 to the first device 102 through the communication path 104 of FIG. 10.

The content delivery system 100 describes the module functions or order as an example. The modules can be partitioned differently. For example, the collection module 702 and the context determination module 704 can be combined. Each of the modules can operate individually and independently of the other modules. Furthermore, data generated in one module can be used by another module without being directly coupled to each other. For example, the content management module 728 can receive the first user profile 218 from the personalization module 706.

The modules described in this application can be hardware implementation or hardware accelerators in the first control unit 612 or in the second control unit 634. The modules can also be hardware implementation or hardware accelerators within the first device 102 or the second device 106 but outside of the first control unit 612 or the second control unit 634, respectively.

It has been discovered that the content delivery system 100 generates the first user profile 218 most relevant to the context 202. By generating the first user profile 218 most relevant to the context 202, the content delivery system 100 can generate the display content 502 pertinent to the user of the first device 102. As a result, the content delivery system 100 can deliver the display content 502 efficiently to enhance the user experience of using the first device 102 and the content delivery system 100.

Figure 8:
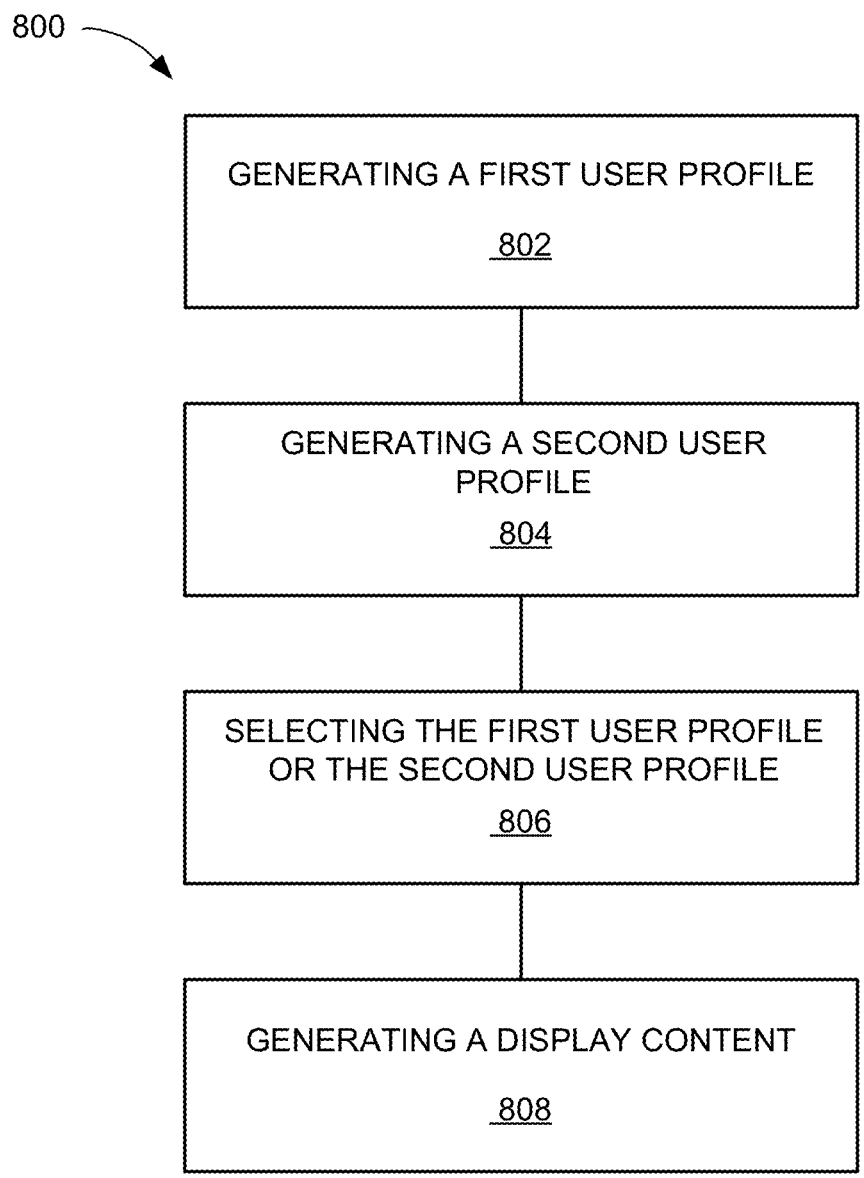
FIG. 8 is a flow chart of a method of operation of a content delivery system in an embodiment of the present invention.

Referring now to FIG. 8, therein is shown a flow chart of a method 800 of operation of a content delivery system 100 in an embodiment of the present invention. The method 800 includes: generating a first user profile for representing a user's identity in a context in a block 802; generating a second user profile for representing the user's identity in a different context in a block 804; selecting the first user profile or the second user profile based on the context or the different context in a block 806; and generating a display content based on the first user profile or the second user profile for displaying on a device in a block 808.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a content delivery system comprising:
    generating a feature set based on filtering a profile feature representing a user information, an external information, or a combination thereof unrelated to a context;
    generating a first user profile based on the feature set with a control unit for representing a user's identity in the context;
    generating a second user profile for representing the user's identity in a different context for a same user as the first user profile;
    comparing a feature weight of the first user profile to the feature weight of the second user profile;
    selecting the first user profile or the second user profile based on a higher value of the feature weight for the context or the different context;
    generating a display content based on the first user profile or the second user profile for displaying on a device; and
    deleting the first user profile or the second user profile based on a time threshold for placing a time limit on using the first user profile or the second user profile for generating the display content.

2. The method as claimed in claim 1 wherein generating the first user profile includes generating the first user profile having the profile feature with the feature weight meeting or exceeding a weight threshold.

3. The method as claimed in claim 1 wherein generating the first user profile includes calculating the feature weight for customizing the first user profile for the context.

4. The method as claimed in claim 1 wherein selecting the first user profile includes selecting the first user profile based on the feature weight for the profile feature of the first user profile.

5. The method as claimed in claim 1 further comprising:
    generating a user matrix based on parsing a third party content; and
    calculating a similarity index based on the user matrix for identifying the third party content relevant for displaying the device.

6. A method of operation of a content delivery system comprising:
    generating a feature set based on filtering a profile feature representing a user information, an external information, or a combination thereof unrelated to a context;
    generating a first user profile based on the feature set including the profile feature with a control unit for representing a user's identity in the context;
    generating a second user profile having the profile feature for representing the user's identity in a different context for a same user as the first user profile;
    comparing a feature weight of the first user profile to the feature weight of the second user profile;
    selecting the first user profile or the second user profile based on a higher value of the feature weight for the context or the different context;
    generating a display content based on the first user profile or the second user profile for displaying on a device; and
    deleting the first user profile or the second user profile based on a time threshold for placing a time limit on using the first user profile or the second user profile for generating the display content.

7. The method as claimed in claim 6 wherein generating the first user profile includes generating the first user profile based on a feature set for customizing the first user profile for the context.

8. The method as claimed in claim 6 wherein generating the first user profile includes generating the profile feature based on the user information, the external information, or a combination thereof for customizing the first user profile for the context.

9. The method as claimed in claim 6 wherein selecting the first user profile includes selecting the first user profile over the second user profile based on the feature weight of the profile feature.

10. The method as claimed in claim 6 further comprising deleting the first user profile having the feature weight of the profile feature failing to meet a weight threshold.

11. A content delivery system comprising:
    a control unit configured to:
        generate a feature set based on filtering a profile feature representing a user information, an external information, or a combination thereof unrelated to a context,
        generate a first user profile based on the feature set for representing a user's identity in the context,
        generate a second user profile for representing the user's identity in a different context for a same user as the first user profile,
        compare a feature weight of the first user profile to the feature weight of the second user profile,
        select the first user profile or the second user profile based on a higher value of the feature weight for the context or the different context,
        generate a display content based on the first user profile or the second user profile,
        delete the first user profile or the second user profile based on a time threshold for placing a time limit on using the first user profile or the second user profile for generating the display content, and
    a communication interface, coupled to the control unit, configured to send the display content for displaying on a device.

12. The system as claimed in claim 11 wherein the control unit is configured to generate the first user profile having the profile feature with the feature weight meeting or exceeding a weight threshold.

13. The system as claimed in claim 11 wherein the control unit is configured to calculate the feature weight for customizing the first user profile for the context.

14. The system as claimed in claim 11 wherein the control unit is configured to select the first user profile based on the feature weight for the profile feature of the first user profile.

15. The system as claimed in claim 11 wherein the control unit is configured to:
    generate a user matrix based on parsing a third party content; and
    calculate a similarity index based on the user matrix for identifying the third party content relevant for displaying the device.

16. The system as claimed in claim 11 wherein the control unit is configured to:
    generate a first user profile having the profile feature for representing a user's identity in a context; and
    generate a second user profile having the profile feature for representing the user's identity in a different context.

17. The system as claimed in claim 16 wherein the control unit is configured to generate the first user profile based on a feature set for customizing the first user profile for the context.

18. The system as claimed in claim 16 wherein the control unit is configured to generate the profile feature based on the user information, the external information, or a combination thereof for customizing the first user profile for the context.

19. The system as claimed in claim 16 wherein the control unit is configured to select the first user profile over the second user profile based on the feature weight of the profile feature.

20. The system as claimed in claim 16 wherein the control unit is configured to delete the first user profile having the feature weight of the profile feature failing to meet a weight threshold.

* * * * *